United States Patent
Nakamura

[11] Patent Number: 5,850,343
[45] Date of Patent: Dec. 15, 1998

[54] MACHINE TOOL CONTROL SYSTEM

[76] Inventor: Kaoru Nakamura, 2-18-13, Takamori, Isehara, Kanagawa 259-11, Japan

[21] Appl. No.: 701,651
[22] Filed: Aug. 26, 1996
[51] Int. Cl.[6] .................................................. G06F 19/00
[52] U.S. Cl. ............................. 364/474.16; 364/474.15; 364/474.11; 364/474.21; 364/468.19
[58] Field of Search .................................... 364/148–151, 364/131–135, 156, 468.01, 468.02, 468.03, 468.05, 468.09, 468.1, 468.19, 468.23, 474.11, 474.14, 474.15, 474.21, 468.06, 468.07

[56] References Cited

U.S. PATENT DOCUMENTS 4,901,218  2/1990  Cornwell ................................ 364/131
5,307,346  4/1994  Fieldhouse ............................ 370/85.1
5,434,790  7/1995  Saka et al. .......................... 364/474.11
5,684,708  11/1997 Kondou et al. ..................... 364/474.15

Primary Examiner—Reba I. Elmore
Assistant Examiner—Thomas E. Brown
Attorney, Agent, or Firm—Greenblum & Bernstein, P.L.C.

[57] ABSTRACT

When a machining program copied from the toll center is transferred to the NC device, the transfer system determining means of the controller compares a machining schedule copied from the toll center and its machining program with transfer judging rules created in the database to automatically judge whether memory transfer or DNC transfer system is more suitable, and the machining program transfer means transfers the machining program to the NC device by the selected system.

9 Claims, 13 Drawing Sheets

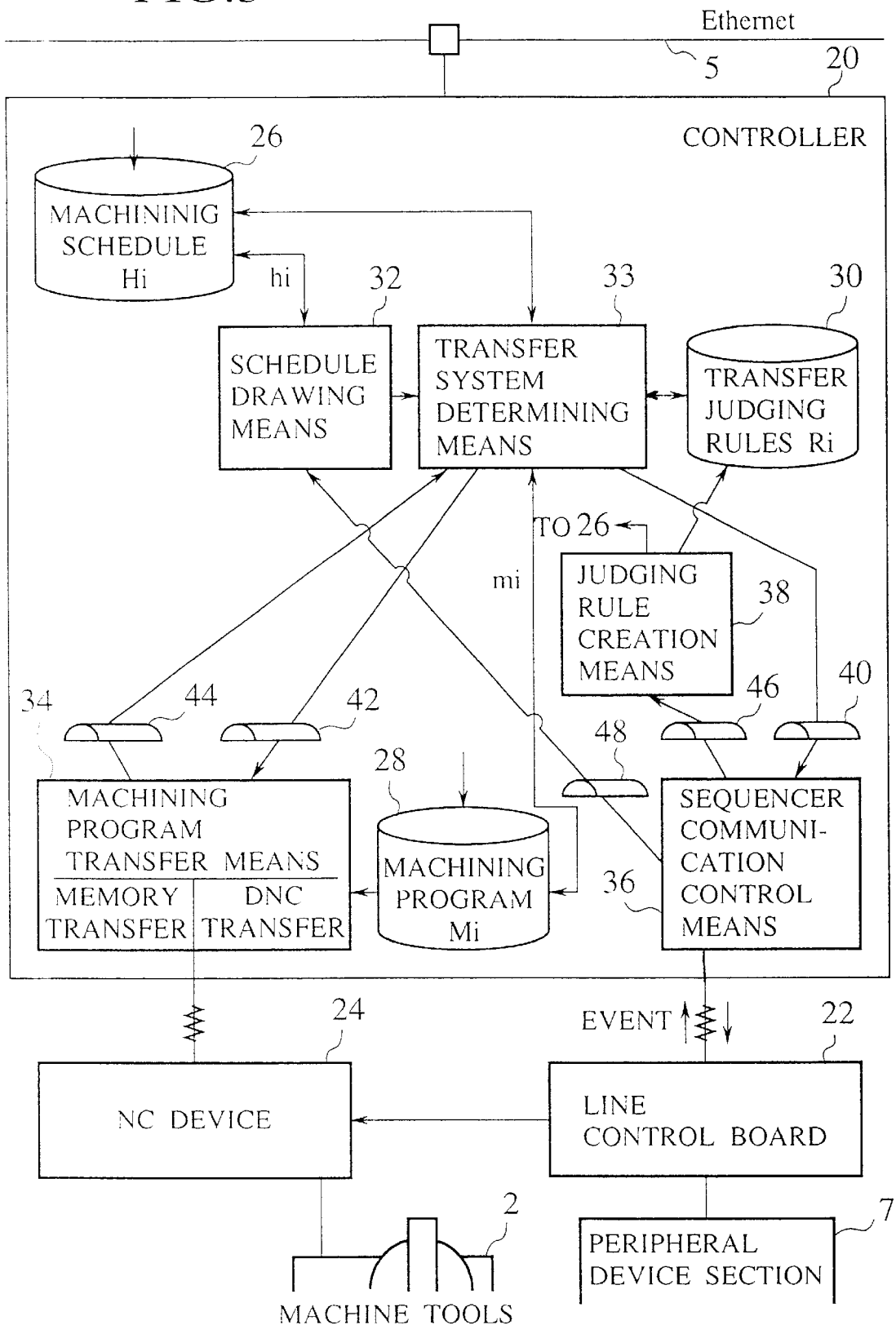

FIG.4

MACHINING SCHEDULE Hi

| PRODUCT NUMBER (Ha) | PRODUCTION START DATE (Hb) | PRODUCTION COMPLETION DATE (Hc) | QUANTITY (Hd) | TYPE OF MACHINING (He) | REPEAT (Hf) | | | |
|---|---|---|---|---|---|---|---|---|
| P$_1$ | 3/10 | 3/15 | 5 | PUNCHING | ○ | | | |
| P$_2$ | 3/11 | 3/16 | 1000 | BENDING | | | | |
| | | | | | | | | |
| | | | | | | | | |
| | | | | | | | | |
| | | | | | | | | |
| | | | | | | | | |

FIG. 5

JUDGING TABLE 50

(a)

| ELEMENT | a PRODUCTION TYPE | Ra AVERAGE PRODUCTION QUANTITY | Rb AVERAGE MACHINING STANDARD TIME | Rc MACHINING PROGRAM LENGTH | Rd TYPE OF MACHINE | Re TRANSFER SYSTEM AT THE TIME OF TROUBLE | Rf |
|---|---|---|---|---|---|---|---|
| MEMORY TRANSFER (M)  1.0 | SMALL | MORE THAN 1000 | LESS THAN 23 MINUTES | LESS THAN 500B | BENDING | CONTINUING | |
| ap { 0.9 | | | LESS THAN ONE MINUTES | LESS THAN 1KB | LASER | | |
| 0.8 | | | LESS THAN 5 MINUTES | | | | |
| 0.7 | | | | | | | |
| DNC TRANSFER (D)  0.7 | LARGE | LESS THAN 5 | LESS THAN 10 MINUTES | | | | |
| aq { 0.8 | | | LESS THAN ONE HOUR | MORE THAN 1 TO 2KB | | | |
| 0.9 | | | MORE THAN ONE HOUR | MORE THAN 2KB | NCT | REDOING | |
| 1.0 | | | | | | | |

ELEMENT DATA SECTION (b)

| | a | Ra | Rb | Rc | Rd | Re |
|---|---|---|---|---|---|---|
| WEIGHTING COEFFICIENT | (bi) 0.2 | 0.2 | 0.2 | 0.1 | 0.1 | 0.1 |
| PRIORITY | 4 | 3 | 1 | 2 | 5 | 6 |

A : MULTI-TYPE SMALL-QUANTITY PRODUCTION
B : SMALL-TYPE LARGE-QUANTITY PRODUCTION
-  : SINGLE-TYPE UNIFORM PRODUCITON

MACHINING PROGRAM LENGTH : LENGTH OF ONE PROGRAM

FIG.6

PARTS INFORMATION MASTER TABLE 52

| PART NUMBER | MACHINING PROGRAM | ADAPTED TRANSFER SYSTEM | PREVIOUS TRANSFER SYSTEM | MACHINING TIME | MACHINING PROGRAM LENGTH | TYPE OF MACHINE | | | |
|---|---|---|---|---|---|---|---|---|---|
| | Ga | Gb | Gc | Gd | Ge | Gf | Gh | | |
| $P_1$ | NC DATA 1 | M | M | 30 MINUTES | 1KB | | | | |
| $P_2$ | NC DATA 2 | D | D | 15 MINUTES | 10KB | | | | |
| $P_3$ | | | | | | | | | |

MACHINE TOOL CONTROL SYSTEM

BACKGROUND OF THE INVENTION

This invention relates to a machine tool control system and, more specifically, to a machine tool control system which changes the transfer system of a machining program to an NC device or the sequence of the monitoring control side in accordance with the current condition of the machine tool side on occasion.

In recent years, in the field of machining for controlling various types of machine tools which is directed toward multi-type small-quantity production, FMS has been coming into wide use. Generally speaking, FMS is such that a plurality of device controllers are connected to a single main controller which creates a schedule program for the schedule operation of various types of devices. An example of such FMS (Flexible Manufacturing System) is explained using a line control system for machine tools.

FIG. 1 is a schematic structural diagram of a machine tool line control system of the prior art. In the machine tool line control system of FIG. 1, a toll center 1 and a field terminal 4 (to be referred to as "controller" hereinafter) for transferring a machining program to an NC device 3 for controlling machine tools 2 consisting of an NC turret punch press, bending press and the like are connected to Ethernet 5.

To the machine tools 2 is connected a peripheral device section 7 including material warehouse equipment, product warehouse equipment and the like. A group of the peripheral device section 7, the machine tools 2 and the NC device 4 is referred to as "machine tool side" or "FM line" in the following description.

To the peripheral device section 7 is connected a line control board 8. The toll center 1 is provided with a database 10 for storing machining schedules each of which consists of date, type of machining, materials, quantities, spots to be machined and the like and a database 11 for storing a plurality of machining programs for carrying out control in accordance with type of machining.

The controller 4 is activated to communicate with the toll center 1, read the machining schedule of the day, store this machining schedule in its internal database 12, retrieve a machining program for carrying out this machining schedule properly and store it in its internal database 14.

Thereafter, the machining program of the database is transferred to the NC device 3 in accordance with preset transfer system (DNC transfer or memory transfer).

This transfer system is switched between DNC transfer system and memory transfer system depending on production type, i.e., multi-type small-quantity production, single-type uniform production, or small-type large-quantity production, whether or not a machining program used is extremely long, whether or not the machining tact of a mechanical facility is long, or the like.

In the case of DNC transfer system which is also called direct control transfer system, the controller 4 transfers the machining program of the database to the NC device by each block sequentially for the direct control of the NC device.

The DNC transfer system is selected when type of production is generally multi-type small-quantity production or single-type uniform production or when the machining program is extremely long.

Further, the memory transfer system is selected for small-type large-quantity production or when the machining program is short.

The line control board 8 on the monitor control side controls the sequence of cells of the material warehouse equipment, the product warehouse equipment and the like in accordance with a ladder sequence program while monitoring the conditions of these equipment.

Meanwhile, there are various sequences for operating the machine tools, warehouses and workpieces in an FMS line according to machining schedule. For example, there are available various control patterns for operating the following sequences:

(1) a sequence for complex machining using a machining line consisting of an NCT, laser and the like for multi-type small-quantity production and single-type uniform production;

(2) a sequence for carrying out a plurality of schedules simultaneously;

(3) a sequence for operating devices which require special judgment before and after;

(4) a sequence for operating a facility that requires a certain measure of intelligent judgment when trouble occurs; and (5) a sequence which requires synchronization between composite lines.

The control patterns include:

(A) one for causing the controller to instruct the flow of workpieces in accordance with a schedule;

(B) one for changing operation system (memory transfer or DNC transfer) according to the length of a program;

(C) one for operating a machine tool by giving a simple M code to a simple cell (one group-controlled cell); and (D) one for carrying out high-speed operation by storing all the above sequence information on the FMS side and selecting one when there are a large number of lots and an extremely small number of types and an extremely high-speed machine tool is required.

In other words, after an operation control pattern for a machining schedule is determined, an FMS line is operated in accordance with the sequence of any one of the operation control patterns.

The transfer system of the machine tool line control system of the prior art is such that DNC transfer or memory transfer is preset in the controller in accordance with user's specifications and the machining program of the toll center is transferred to the NC device in one of the transfer modes.

For instance, when small-type large-quantity production is selected through discussions between a manufacturer and a user on system installation, a machine tool control system in which memory transfer system is preset is shipped.

However, in recent years, users have been shifting from single-type large-quantity production to multi-type small-quantity production. A machining program for such production is generally huge.

However, since memory transfer system is preset, a huge machining program must be transferred at one time to machine products of a single type. Therefore, there has been such a problem that the time elapsed until actual machining is carried out is extremely long.

Since the NC device must store a huge machining program for machining products of a single type, it may run short of an area for storing the machining condition of a latter stage.

Further, when a machine tool control system of DNC transfer system is installed, a user may need a small-type, large-quantity production line.

Although memory transfer system is the most efficient in this case, it is impossible to change the system to DNC transfer system. Therefore, transfer must be carried out the number of times of machining with this DNC transfer system for machining products of the same type. As a result, there are further problems that transfer time takes long and machining time becomes slow.

Meanwhile, after an operation control pattern for a machining schedule in the FMS line is determined, the FMS line is operated with the sequence of either one of operation control patterns.

However, the operation control pattern may not be suitable for machining for reasons of the FMS line. For example, there is the case where there is a shortage of materials or the type of machining must be changed for reasons of a user.

However, in the conventional machine tool control system, to change the sequence after an operation pattern has been determined based on the machining schedule, an operation control pattern which is suitable for the type of machining must be set.

That is, the conventional machine tool control system involves a problem that the condition of the FMS line cannot be changed to the sequence of a control pattern in accordance with the current condition of the FMS line.

SUMMARY OF THE INVENTION

It is an object of the present invention which has been made to solve the above problems to provide a machine tool control system which detects type of machining based on the machining schedule of a user on occasion and can set and change the FMS line to a state suited to the type of machining on occasion.

The present invention provides a machine tool control system comprising a controller for creating an operation schedule for a monitor control side by copying the machining schedule and machining program of a toll center through a local area network and an NC device for storing and transmitting the machining program sent by the controller to machine tools, wherein the controller comprises automatic transfer system determining section for storing judging rules for judging by which transfer system the machining program should be transferred to the NC device, memory transfer system or DNC transfer system, comparing the judgment rules with the machining schedule and the machining program when the machining program is to be transferred to the NC device, and automatically determining which is suitable, memory transfer system or DNC transfer system.

According to this invention, when a machining program copied from the toll center is to be transferred to the NC device, the machining schedule copied from the toll center and its machining program are compared with prestored judging rules and memory transfer system or DNC transfer system is automatically selected. The machining program is transferred to the NC device by the selected one of the systems.

According to a preferred aspect of the invention, the automatically transfer system determining section of the controller reads the monitor information of the monitor control side and updates the set data of judging rules corresponding to the monitor information based on the monitor information.

In this aspect, the set data of the judging rules are updated based on the monitor information of the monitor control side. Therefore, memory transfer system or DNC transfer system is selected based on the current condition of the machine tool side to transfer a machining program.

According to another preferred aspect of the invention, the automatic transfer system determining section computes the weighting degree of each set data of the judging rules based on a priority item for machining operation included in the monitor information and selects memory transfer system or DNC transfer system based on the result of this computation.

In this aspect, the automatic transfer system determining section of the controller reads monitor information from the monitor control side and computes a weighting coefficient of each set data of the judging rules based on a priority item for machining operation included in the monitor information. It is determined whether memory transfer system or DNC transfer system is more suitable for the transfer of a machining program from the result of computation of the weighting coefficient of each item of the judging rules.

According to another preferred aspect of the invention, the automatic transfer system determining section comprises a first database for storing a machining schedule for scheduling by when, what product and how many products be machined and stored in a warehouse, a second database for storing a machining program for producing products based on the machining schedule, a third database for storing judging rules divided into two sections for memory transfer and DNC transfer systems, each including production type which indicates single-type large-quantity production or multi-type small-quantity production, average production quantity, machining time and machining program length as set data, schedule drawing means for drawing a desired machining schedule from the first database, transfer system determining means for retrieving a machining program suitable for the machining schedule from the second database, judging which section set data of the judging rules of the third database the relationship between the machining program and the machining schedule satisfies and selecting the transfer system of the section of the result of this judgment, and machining program transfer means for transferring all the machining program to the memory of the NC device when transfer system determined by the transfer system determining means is memory transfer system and transferring the machining program to the NC device by each block when the transfer system is DNC transfer system.

In this aspect, the schedule drawing means draws a desired machining schedule from the first database. Thereafter, a machining program suitable for this machining schedule is retrieved from the second database by the transfer system determining means, it is judged which the relationship between the machining schedule and the machining program satisfies, the set data of the memory transfer section or the set data of the DNC transfer section of the judging rules of the third database, and transfer system that satisfies the relationship is selected. Then, when transfer system is determined to be memory transfer system, a corresponding machining program in the second database is all transferred to the memory of the NC device by the machining program transfer means. When transfer system is determined to be DNC transfer system, a corresponding program in the second database is transferred to the NC device by each block.

According to another preferred aspect of the invention, the automatic transfer system determining section comprises judging rule creation means for reading the monitor information of the monitor control side and updating the set data of a corresponding section of the judging rules to information included in the monitor information when the monitor information indicates information included in the set data of the memory transfer section or DNC transfer section of the judging rules.

In this aspect, the monitor information of the monitor control side is read by the judging rule creation means and information included in the set data of the memory transfer section of the third database is updated to information included in the monitor information when the monitor information indicates information in the set data of the memory transfer section. When the monitor information indicates information included in the set data of the DNC transfer section, information in the set data of the DNC transfer section of the third database is updated to information included in the monitor information.

According to another preferred aspect of the invention, the judging rules consist of (1) a first judging table which is divided into two sections for memory transfer system and DNC transfer system, each including at least production type indicating single-type large-quantity production or multi-type small-quantity production, average production quantity, machining time and machining program length as set data and in which a weighting coefficient is given to each set data, and (2) a second judging table for storing product number, the name of a machining program and actual transfer system as a set.

In this aspect, the set data of the memory transfer section and the set data of the DNC transfer section of the first judging table of the judging rules of the third database are compared with the machining program and weighting of the set data is determined. Transfer system is determined from the product number, the name of a machining program and actual transfer system of the second table of the judging rules.

According to another preferred aspect of the invention, when monitor information indicates the priority of the set data, the judging rule creation means computes a weighting coefficient of each set data of the first judging table of the judging rules based on the priority and updates to this weighting coefficient.

In this aspect, a weighting coefficient of each set data of the first judging table of the judging rules of the third database is computed based on priority indicated by the monitor information from the monitor control side by the judging rule creation means and the weighting coefficient is updated to this computed weighting coefficient.

According to another preferred aspect of the invention, the judging rule creation means stores product number, the name of a machining program and actual transfer system on the machine tool side indicated by the monitor information in the second judging table as a set and sets a machining completion symbol in a machining schedule for machining a product having the product number on the machine tool side.

In this aspect, product number, the name of a machining program and actual transfer system on the machine tool side monitored by the monitor control side are stored in the second judging table of the third database by the judging rule creation means as a set. A machining completion symbol is set in the machining schedule of the first database.

According to another preferred aspect of the invention, the transfer system determining means judges which section set data of the first judging table of the judging rules the relationship between the machining program and the machining schedule satisfies, provisionally selects the transfer system of the section of the result of this judgment, computes the weighting degrees of the set data of both sections, compares the results of the computation and determines transfer system.

In this aspect, the transfer system determining means judges which the relationship between the machining program and the machining schedule satisfies, the set data of the memory transfer section or the set data of the DNC transfer section of the first judging table of the judging rules. The result of this judgment is made provisional and weighting coefficients of the set data of both sections are compared to determine real transfer system.

According to another preferred aspect of the invention, the transfer system determining means retrieves the name of a machining program for the product number in the machining schedule from the second judging table of the judging rules when a machining completion symbol is set in the machining schedule of the first database and selects the transfer system of the retrieved machining program.

In this aspect, when the machining schedule of the first database is read and a machining completion symbol is set in the machining schedule, the transfer system determining means retrieves a machining program for the product number in this machining schedule from the second judging table and selects the transfer system of the retrieved machining program.

According to another preferred aspect of the invention, the controller stores a plurality of control programs for monitoring and controlling the machine tool side and a plurality of ladder programs, retrieves a ladder program suitable for the control program and sends it to the monitor control side.

In this aspect, when a control program is drawn, a ladder program suitable for this control program is retrieved and sent to the monitor control side. Therefore, a plurality of ladder programs do not need to be stored in the line control board on the monitor control side.

According to another preferred aspect of the invention, the controller comprises a fourth database for storing a plurality of control programs, a fifth database for storing a plurality of ladder programs, an operation schedule creation section for creating an operation schedule for the machine tool side suitable for a machining schedule when the machining schedule is drawn and reading a control program for the operation schedule from the fourth database, and a ladder transfer section for retrieving a ladder program suitable for the control program read by the operation schedule creation section and sending it to the monitor control side.

In this aspect, when the automatic transfer system judging section receives the current monitor information of the machine tool side acquired by the monitor control side, an operation schedule is newly created by the operation schedule creation section based on this current monitor information and a relevant control program is drawn from the fourth database. A ladder program suitable for this control program is retrieved from the fifth database and sent to the monitor control side by the ladder transfer section. Therefore, the line control board on the monitor control side performs sequence control based on the operation schedule in accordance with the current condition of each machine tool.

The above objects, features and advantages of the invention will become more apparent from the following description when taken in conjunction with the accompanying drawings.

BRIEF DESCRIPTION OF THE DRAWINGS

In the accompanying drawings:

FIG. 3 is a schematic structural diagram of a controller of Embodiment 1 of the present invention;

FIG. 4 is a diagram for explaining a machining schedule stored in a database 26;

FIG. 5 is a diagram for explaining the judging table of transfer judging rules;

FIG. 6 is a diagram for explaining the parts information master table of the transfer judging rules;

DESCRIPTION OF THE PREFERRED EMBODIMENTS

Embodiment 1

Figure 1:
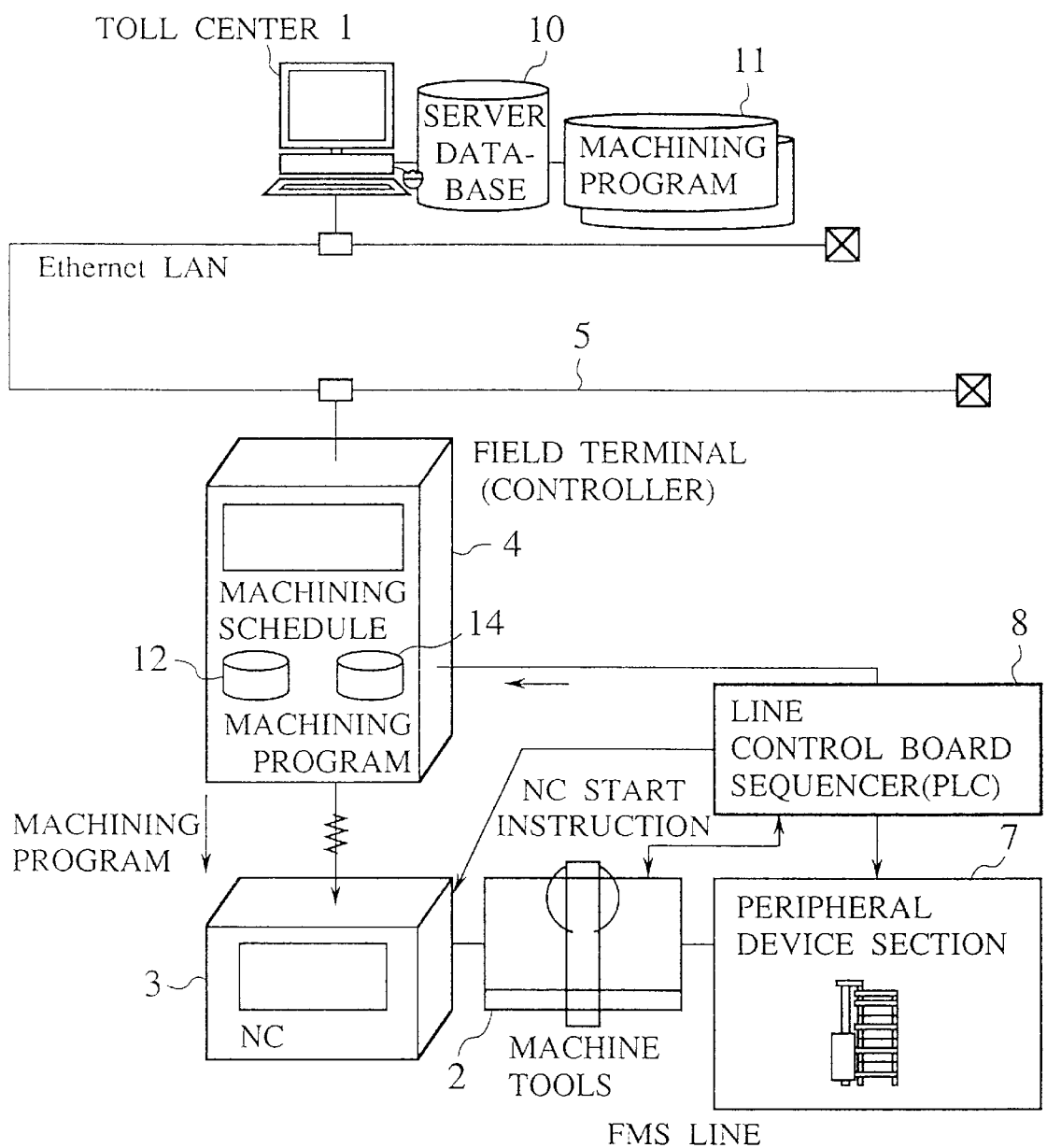
FIG. 1 is a schematic structural diagram of a machine tool line control system of the prior art.
Figure 2:
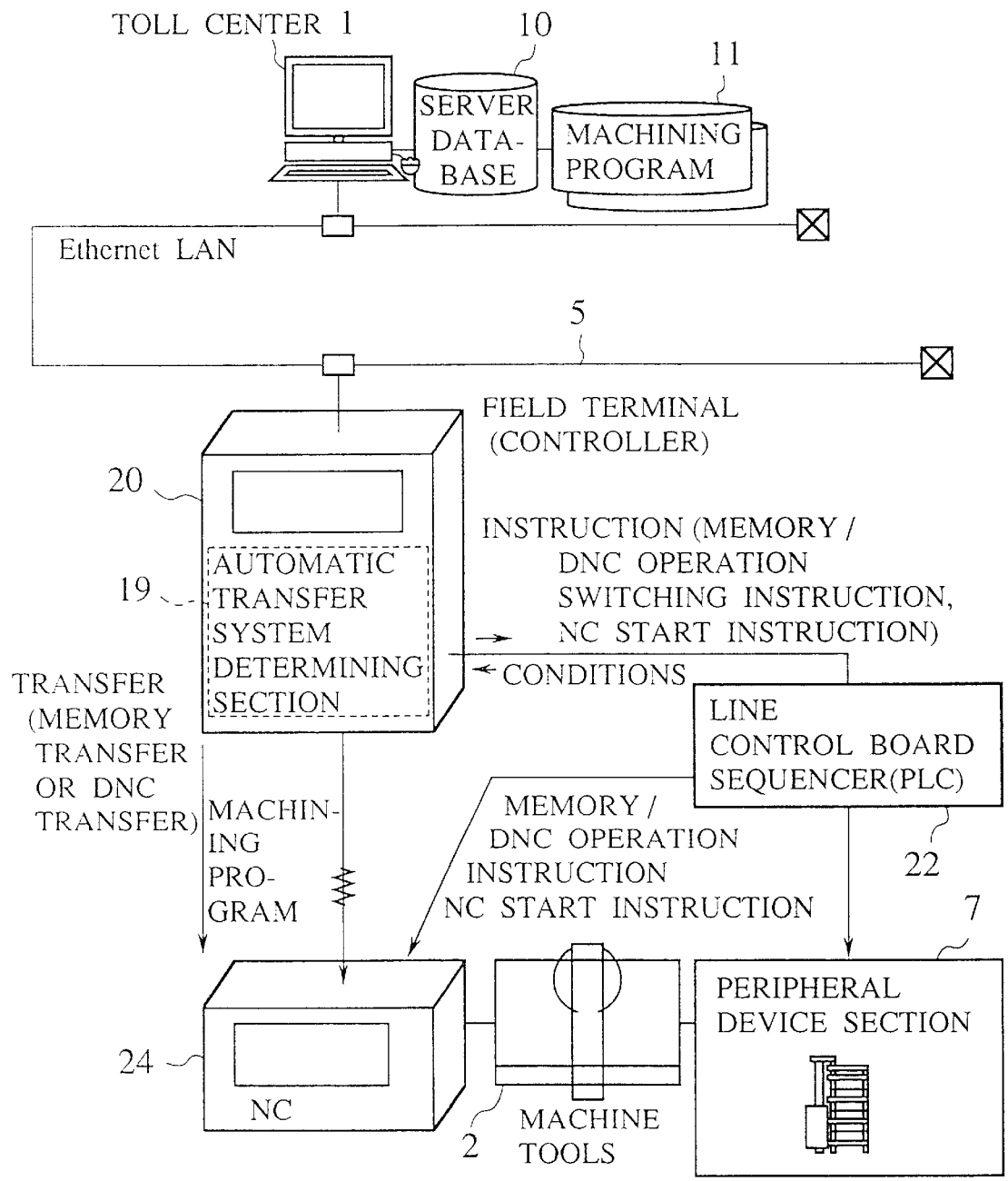
FIG. 2 is a schematic structural diagram of a machine tool line control system according to Embodiment 1 of the present invention.

FIG. 2 is a schematic structural diagram of a machine tool line control system according to Embodiment 1 of the present invention. The machine tool line control system shown in FIG. 1 comprises (1) a controller 20 having an automatic transfer system determining section 19 for copying a machining schedule and a machining program from a toll center 1 through Ethernet 5, automatically selecting memory transfer or DNC transfer system based on preset transfer judging rules, and transferring the machining program to an NC device, (2) a line control board 22 for monitoring each device of a peripheral device section 7, sending monitor information to the controller 20 and the NC device, and activating each device at predetermined timing based on a memory transfer instruction or a DNC transfer instruction from the controller 20, and (3) an NC device 24 for storing the machining program supplied from the controller 20 and sending the stored machining program to machine tools 2 while controlling the machine tools 2 based on a control condition (memory transfer or DNC transfer) from a line control sequencer 22.

(Detailed Constitution of Each Section)

The controller 20, as shown in FIG. 3, comprises a database 26 for storing machining schedules Hi from a database 10 of the toll center 1, a database 28 for storing machining programs Ki from a database 11 of the toll center 1, and a database 30 for storing transfer judging rules Ri for selecting DNC transfer or memory transfer system. The contents of these databases will be described hereinafter.

The controller 20 further comprises schedule drawing means 32, transfer system determining means 33, machining program transfer means 34, sequencer communication control means 36 and judging rule creation means 38. A group of these means is referred to as "automatic transfer system determining section 19".

The toll center 1 and controller 20 may comprise any suitable combination of hardware and/or software for performing the functions and operations described below. For example, the toll center 1 and the controller 20 may include software or control logic and a general purpose computer and associated hardware that is part of the equipment or machinery provided at the location. The processes and operations discussed below may be implemented through software by using any one of a wide variety of programming languages and techniques.

The schedule drawing means 32 draws a machining schedule hi of the day from a plurality of machining schedules Hi stored in the database 26 and informs the transfer system determining means 33 of the address of this machining schedule hi.

The transfer system determining means 33 reads the machining schedule hi from the database 26 based on the address informed by the schedule drawing means 32 and retrieves a machining program mi suitable for this machining schedule hi from a plurality of machining programs Mi stored in the database 28.

Based on the relationship between this machining program mi and the machining schedule hi, the transfer system determining means 33 computes the weighting degree of DNC transfer or memory transfer from the data of the transfer judging rules Ri of the database 30, determines transfer system Ti based on the result of this computation, informs the machining program transfer means 34 of the result of this determination and the machining program mi to be transferred by electronic mail 42, and informs the sequencer communication control means 36 of a switching instruction (memory transfer operation switching instruction or a DNC transfer operation switching instruction) based on the result of determination by electronic mail 40.

The machining program transfer means 34 reads the electronic mail 42 from the transfer system determining means 33, draws the machining program mi to be transferred from the database 28 when the mail is a memory transfer instruction, reads all the machining program mi and transfers it to the memory of the NC device 24.

When the electronic mail 42 is a DNC transfer instruction, the means draws the machining program mi to be transferred from the database 28, and transfers the machining program mi to the NC device 24 by each block. Further, the machining program transfer means 34 informs the transfer system determining means 33 of the condition when the machining program mi (completion of normal transfer, abnormality) is transferred, by electronic mail 44.

The sequencer communication control means 36 reads the electronic mail 40 from the transfer system determining means 33, outputs the contents of this electronic mail 40 to the line control board 22 and outputs the actual monitor information Ui (also called "event") of the peripheral device section 7 from the line control board 22 to the judging rule creation means 38 by electronic mail 46.

This actual monitor information Ui (i=a, b, c ...) consists of actual operation system (DNC transfer operation or memory transfer operation) carried out by the peripheral device section 7 (Ua), idling time of the machining tools 2 or the peripheral device section 7 before the start of operation (Ub), actual operation time of the machine tools 2 or the peripheral device section 7 (Uc), part number (Ud), the name of a machining program (Uf), the name of an item to which an operator actually gave priority (Uj), the priority of the item Uj (Uk), flag indicating whether it is a repeat product (Um), an actual average machining standard time (Ut), actual production type (Up), actual machine tool type (Us) and the like.

When an event from the line control board 22 indicates a machining program transfer request, this transfer request is output to the schedule drawing means 32 by electronic mail 48.

The judging rule creation means 38 reads the electronic mail 46 from the sequencer communication control means 36 and updates the transfer judging rules Ri of the database 30 based on actual monitor information Ui as well as the information of the machining schedules Hi of the database 26. This update processing will be detailed using a flow chart hereinafter.

Figure 3A:
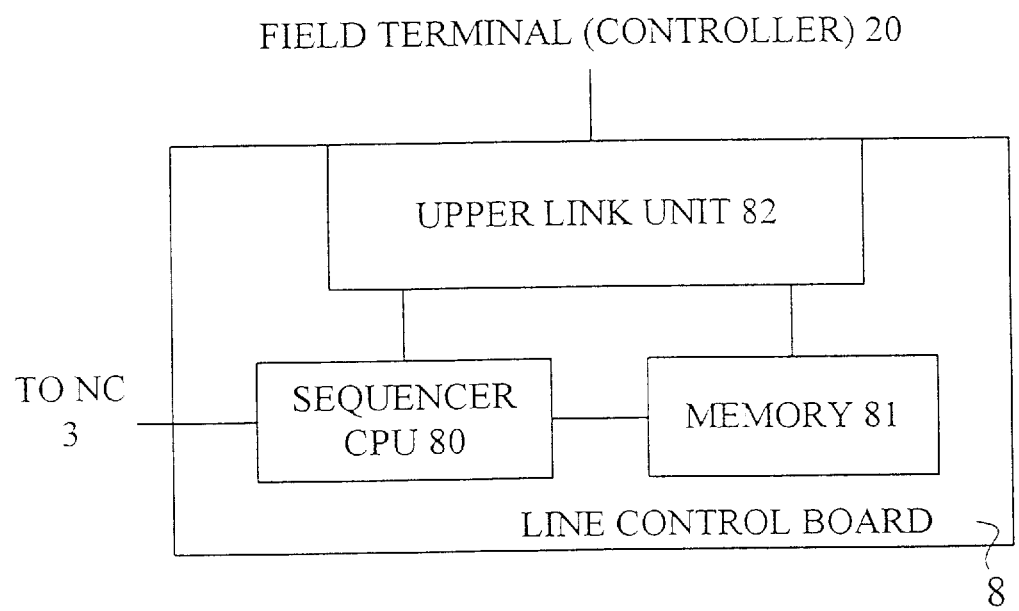
FIG. 3A is a block diagram of a line control board of the present invention.

FIG. 3A shows a block diagram of the line control sequencer 22. The line control sequencer 22 includes an upper link unit 82, a sequencer CPU 80, and a memory 81. The upper link unit 82 exchanges information with an upper CPU (not shown) in the controller 20.

The memory 81 is a temporary memory for storing instructions from upper devices, such as the controller 20.

The sequencer CPU 80 fetches data in the memory 81 and performs the processing of the data, which is sent as processed data to NC 3. Although the line control sequencer 8 is shown as including the upper link unit 82, the sequencer CPU 80, and the memory 81, other combinations of hardware and/or software for performing the above operations may be used.

(Explanation of Contents of Each Database)

FIG. 4 is a diagram for explaining an example of the machining schedule stored in the database 26. The machining schedule Hi (i=a, b, c . . . ) shown in FIG. 4 consists of product number (Ha), production start date (Hb), production completion date (Hc), quantity (Hd), machining type (He), repeat (Hf) and other items and is tabulated for each product number.

For example, the machining schedule of a product numbered $P_1$ is such that the production start date (Hb) is "March 10", the production completion date (Hc) is "March 15", the quantity (Hd) is "5", and a flag is set in the repeat item (Hf). The repeat item (Hf) is an item indicating whether the product was produced in the past or previously, and if the product was produced in the past or previously, a machining completion flag is set. In FIG. 3, this machining completion flag is indicated by "O".

As for a product numbered $P_2$, the production start date (Hb) is "March 11", the production completion date (Hc) is "March 16", and the quantity (Hd) is "1,000 ".

A description is subsequently given of the transfer judging rules Ri. The transfer judging rules Ri consist of a judging table 50 shown in FIG. 5 and a parts information master table 52 shown in FIG. 6.

In the judging table 50, as shown in FIG. 5, element data are divided into two sections: one for memory transfer and the other for DNC transfer, each including production type (Ra), average production quantity (Rb), average machining standard time (Rc), machining program length (Rd), machining tool type (Re), transfer system at the time of trouble (Rf) and the like.

A weighting coefficient is given to each of the production type (Ra), average production quantity (Rb), average machining standard time (Rc), program length (Rd), machine tool type (Re), transfer system at the time of trouble (Rf) and the like.

Each set data of the judging table 50 is initially set by an operator and updated by the judging rule creation means 38 thereafter.

The parts information master table 52, as shown in FIG. 6, includes the name of a machining program (Gb), actually adapted transfer system (Gc), previous transfer system determined by the controller 30 (Gd), actual machining time (Ge), machining program length (Gf), machining tool type (Gh) and the like for each product number (Ga).

Taking a product numbered $P_1$ as an example, the table shows that the machining program is "NC DATA 1", the previous transfer system determined by the transfer system determining means 33 (Gd) is "memory transfer system (M)", the actually adapted transfer system (Gc) is also "memory transfer system (M)", the machining time (Ge) is "30 minutes", and the machining program length (Gf) is "1 K-byte".

The item of the above adapted transfer system (Gc) is described. In the machining tool line control system, various things happen. For example, there is a case where, even when single-type, large-quantity production has been planned in the machining schedule, there are only a few starting materials on the material shelf actually. In this case, even when the controller 20 instructs memory transfer system to the NC device, memory transfer operation is not suitable for line operation. Therefore, an operator uses the terminal of the peripheral device section 7 to change the line operation to DNC operation or the like. For this purpose, the item of adapted transfer system (Gc) is provided in the parts information master table 52 to ensure that the adapted operation system (Gc) is the same as the previously used operation system (Gd) determined by the controller 20.

(Explanation of operation)

A description is subsequently given of the operation of a machine tool link control system constituted above. In this embodiment, the controller 20 loads the machining schedule Hi from the database 10 of the toll center 1 when it is activated, stores the machining schedule Hi shown in FIG. 4 in its database 26, loads a machining program Mi for carrying out this machining schedule Hi from the database 11, and stores it in its database 28.

Figure 7:
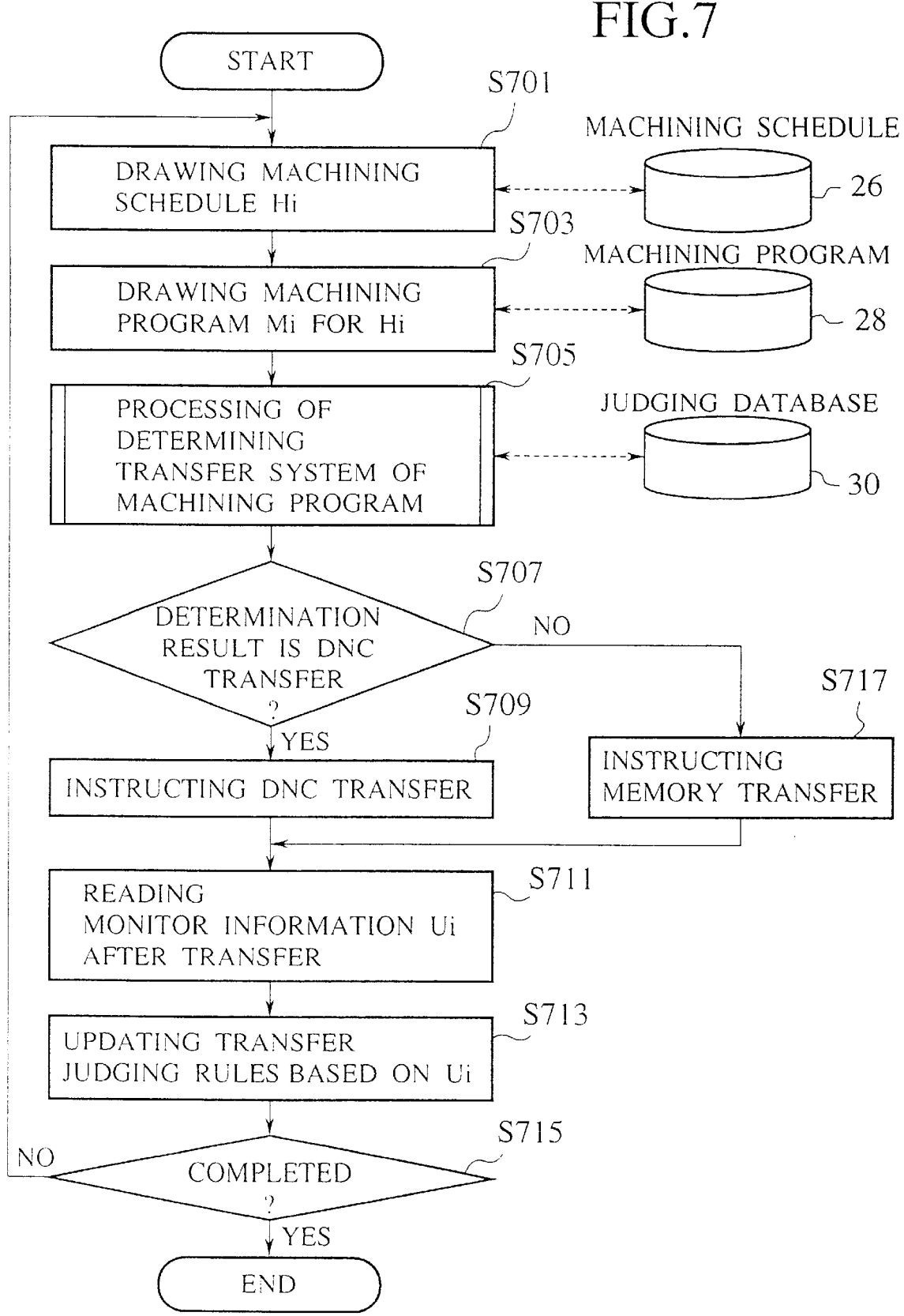
FIG. 7 is a flow chart for explaining the operation of the machine tool line control system of the present invention.

The operation of the machine tool line control system when the machining schedule is stored in the database 26 is schematically described with reference to the flow chart of FIG. 7.

The schedule drawing means 32 of the controller 20 draws the machining schedule of a product numbered $P_1$, for example, from the database 26 as a machining schedule hi of the day and informs the transfer system determining means 33 of the address of the machining schedule hi (S701). The transfer system determining means 33 draws a machining program mi for suitably carrying out the machining schedule stored at the address from the database 28 (S703) and carries out the processing of determining the transfer system of the machining program to determine whether DNC transfer or memory transfer is more suitable from the machining program mi and the transfer judging rules Ri of the database 30 according to weighting degrees (S705).

Details of this processing of determining the transfer system of a machining program will be described hereinafter with reference to a flow chart.

Subsequently, the transfer system determining means 33 determines whether the result of determination in step S705 is DNC transfer system or not (S707).

When the result of determination is DNC transfer system in step S707, an instruction for transferring the machining program mi by DNC transfer system is sent to the machining program transfer means 34 by electronic mail 42 (S709). The machining program transfer means 34 transfers the machining program mi from the database 28 to the NC device 24 by each block in the case of DNC transfer system.

Thereafter, the judging rule creation means 38 reads monitor information Ui (also called event) from the sequencer communication control means 36 after the transfer of the machining program mi (S711) and updates the transfer judging rules of the database 30 based on this monitor information Ui (S713). The processing of updating the transfer judging rules will be described in detail with reference to a flow chart to be described later.

It is judged whether the processing is over (S715). When it is not over, the processing is returned to step 701 to determine the transfer system of the machining program of the next machining system hi+1.

When the result of determination is memory transfer system in step S707, the transfer system determining means 33 sends an instruction for transferring the machining program mi by memory transfer system to the machining program transfer means 34 and the processing proceeds to step S711 (S717).

The machining program transfer means 34 reads all the machining program mi of the database 28 when there is an instruction for memory transfer system, and transfers it to the memory of the NC device 24.

Figure 8:
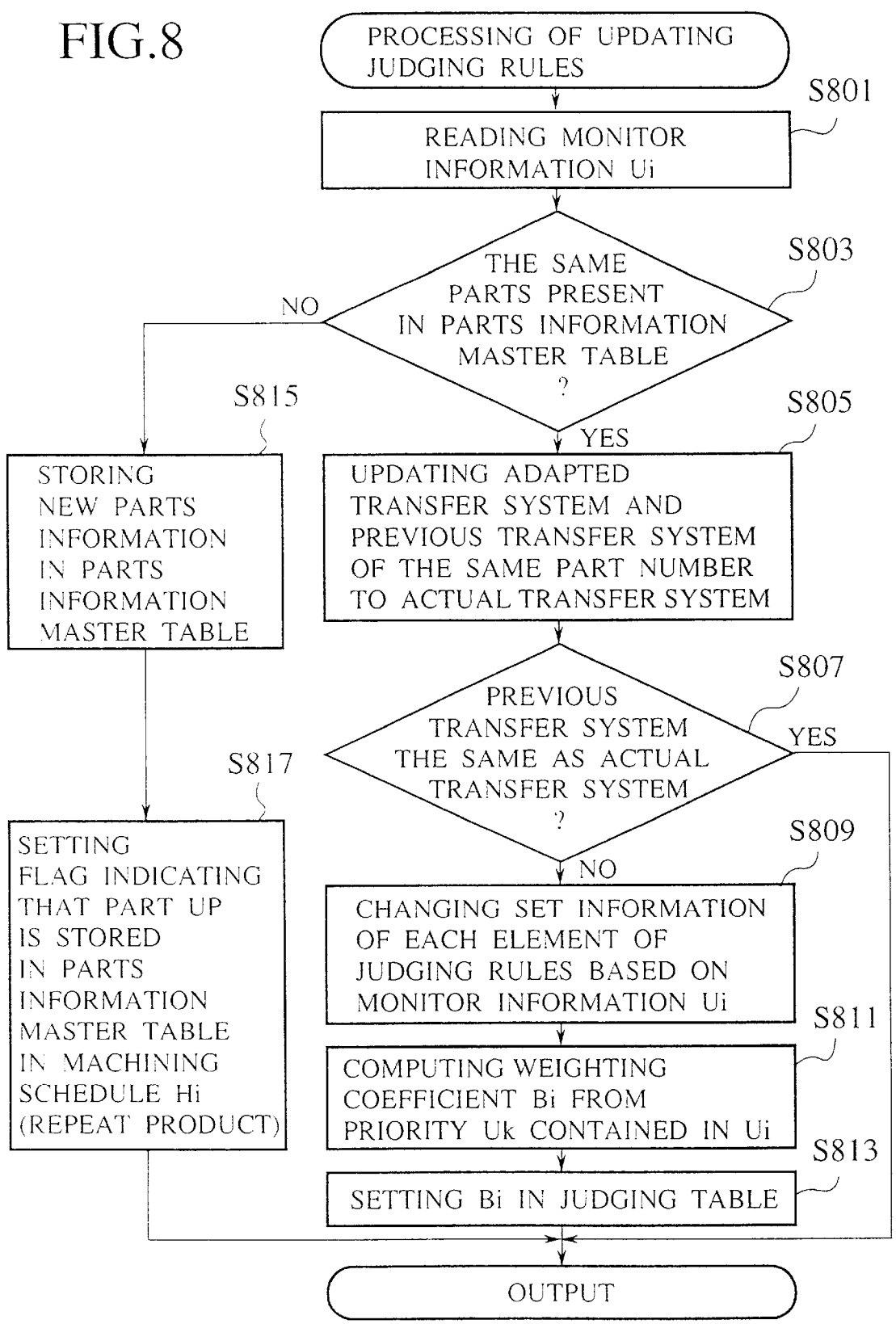
FIG. 8 is a flow chart for explaining the processing of updating the transfer judging rules.

A description is subsequently given of the processing of updating the transfer judging rules with reference to the flow chart of FIG. 8.

The judging rule creation means 38 reads monitor information Ui from the electronic mail 46 sent from the sequencer communication control means 36 (S801). The means judges whether or not the same part number as the part number Ud contained in the monitor information Ui is stored in the part number (Gs) column of the parts information master table 52 (S803).

When it is judged that the same part number Pi is stored in the parts information master table 52, the adapted transfer system (Gc) and the previous transfer system (Gd) of the part number Pi of the parts information master table 52 are changed to the actual operation system (Ua) contained in the monitor information Ui (S805).

For example, when the actual transfer system (Ua) is DNC transfer system and the previous transfer system (Gd) and the adapted transfer system (Gc) of the parts information master table 52 are memory transfer system, the both transfer systems stored in the parts information master table 52 are changed to DNC transfer system.

After this change, it is judged whether the previous transfer system (Gd) and the actual transfer system (Ua) are the same or not (S807). That is, it is judged whether the transfer system determined by the controller 20 is the same as the transfer system (Gc) actually adapted to a certain peripheral device on the line side.

When it is judged that both transfer systems are not the same in step S807, set information of each element of the transfer judging rules Ri is changed based on the monitor information Ui (S809). Then, a weighting coefficient bi of each element is computed from priority Uk contained in the monitor information Ui (S811) and set in the judging table 50 (S813).

A description is given of this priority Uk. When peripheral devices are controlled based on the machining schedule, an operator may change machining time, production quantity and the like according to the conditions of the peripheral devices 7 or the machine tools 2.

For example, when a field operator operates a console (unshown) at a working site to give top priority to average machining time, the judging rule creation means 38 updates the average machining standard time shown in FIG. 5 as the highest priority item.

When it is judged that there is no part number in the parts information master table 52 which is the same as the part number Ud contained in the monitor information Ui in step S803, parts information on this part number Ud is stored in the parts information master table 52 as new parts information (S815).

Then a machining completion flag is set in the machining schedule Hi of the database 26 to indicate that the part number Ud is stored in the parts information master table 52 (S817).

Figure 9:
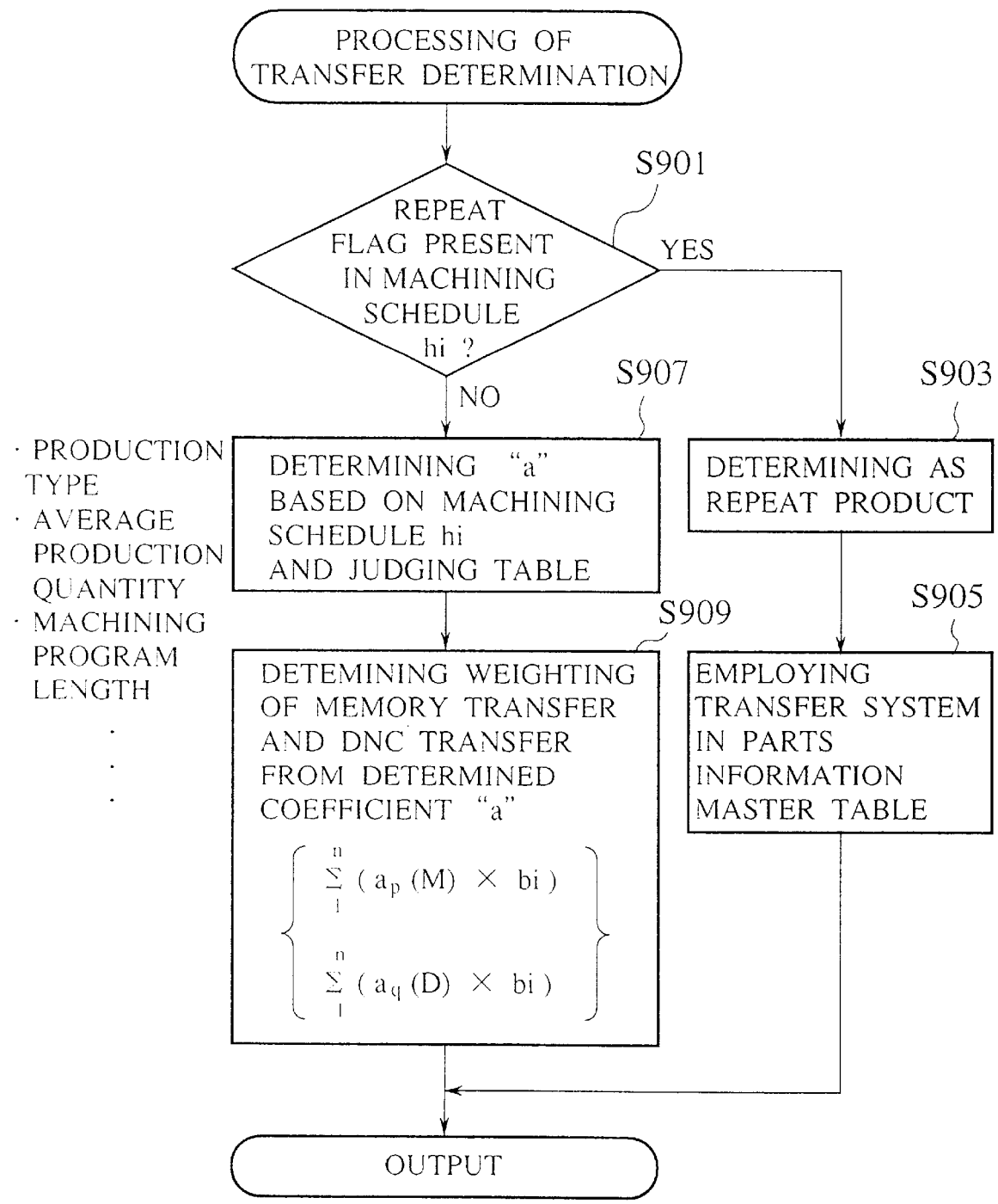
FIG. 9 is a flow chart for explaining the processing of transfer judgment.

A description is subsequently given of the processing of determining the transfer of a machining program. FIG. 9 is a flow chart for explaining the processing of determining the transfer system of a machining program.

The transfer system determining means 33 judges whether or not a repeat flag is set in the drawn machining schedule hi (S901). For instance, when a machining schedule hi for part number $P_1$ is drawn, it is judged that a machined flag is set.

When it is judged that a machining completion flag is set in step S901, the product of the machining schedule hi is determined as a repeat item (S903). Thereafter, when it is determined that it is a repeat product, transfer system for the name of a machining program of this machining schedule is employed from the parts information master table and the processing is completed (S905).

When it is judged that no machining completion flag is set in step S901, a judging coefficient a (there are a judging coefficient ap for memory transfer system and a judging coefficient aq for DNC transfer system) for computing a weighting coefficient is determined based on each data of the element data section of the judging table 50 shown in FIG. 5 and the contents of the machining schedule hi (S907). Using this judging coefficient a, whether DNC transfer or memory transfer system should be employed is computed from the following two equations [1] and [2] shown below (S909) and the processing is completed.

$$\sum_{1}^{n} (a_p(M) x b_i) \quad [1]$$

$$\sum_{1}^{n} (a_q(D) x b_i) \quad [2]$$

where "n" represents the number of elements in the judging table 50.

The reason that weighting of DNC transfer or memory transfer system is computed using these equations [1] and [2] is as follows.

Judging data such as production type, average production quantity, machining program length and the like for judging whether memory transfer or DNC transfer system should be employed are stored in the element data section of the judging table.

Therefore, it is possible to determine which transfer system (DNC transfer or memory transfer system) is more suitable based on the contents of the machining schedule and the judging data of this element data section.

However, determination based on the judging data of this element data section only is not perfect. For instance, even when memory transfer system is selected based on the judging data of this element data section, starting materials for the peripheral device section 7 may run short, an operator may switch to DNC operation according to machining conditions, or an operator may change production type for reasons of a customer who had placed an order. Therefore, the above equations [1] and [2] are computed. By judging a value obtained from these equations in step S909 shown in FIG. 9, DNC transfer or memory transfer system is automatically selected. That is, DNC transfer or memory transfer system can be selected according to the field conditions of the FMS line. The DNC transfer or memory transfer system is selected based on the higher of the values calculated by equations [1] and [2].

Embodiment 2

Figure 10:
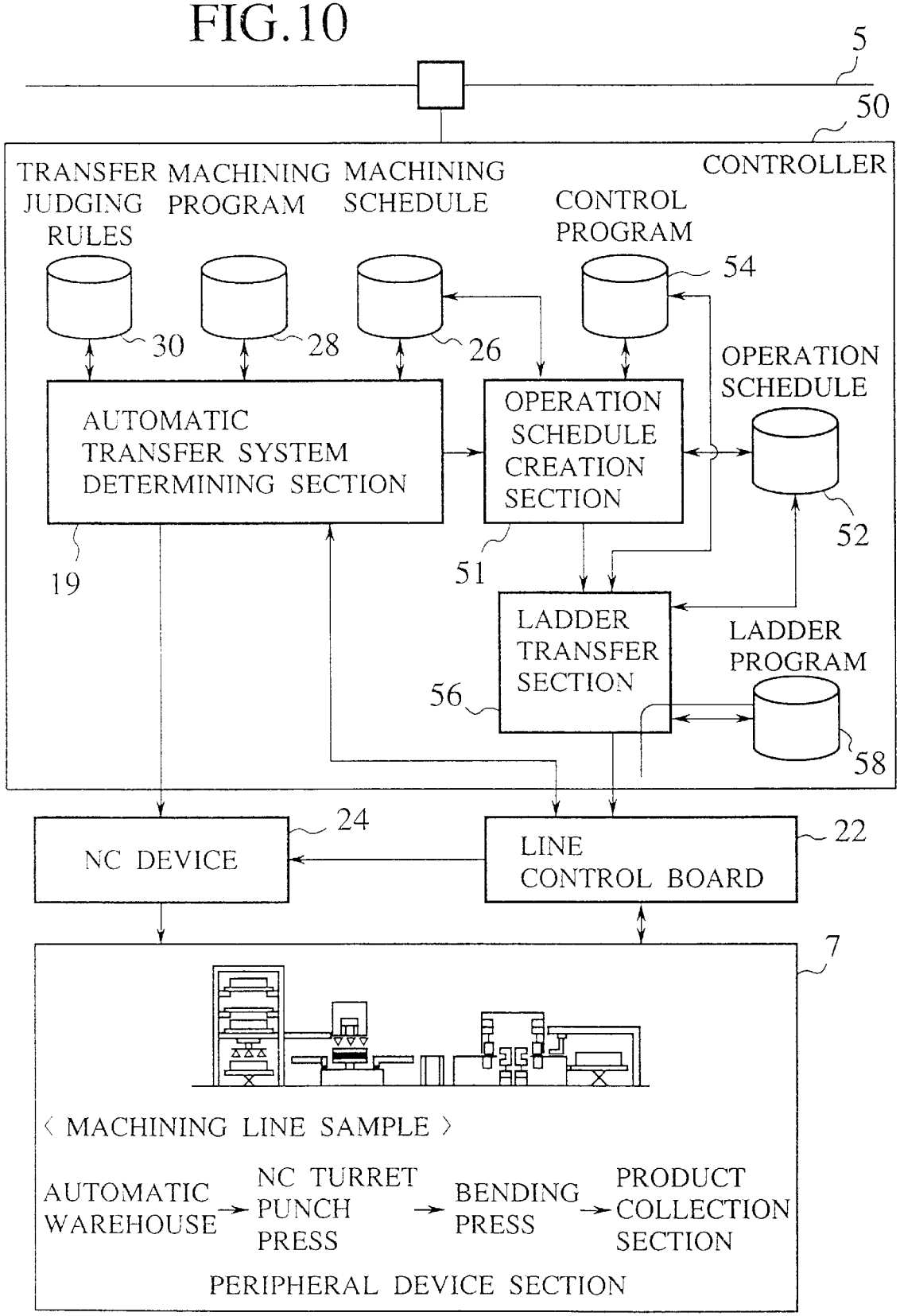
FIG. 10 is a schematic structural diagram of a machine tool line control system according to Embodiment 2 of the present invention.

FIG. 10 is a schematic structural diagram of a machine tool control system according to Embodiment 2 of the present invention. The machine tool control system shown in FIG. 10 comprises (1) an automatic transfer system determining section 19 for storing a machining schedule in a database 26 and a machining program in a database 28 from the toll center 1 through Ethernet 5, automatically determining whether memory transfer or DNC transfer system is more suitable based on transfer judging rules Ri stored in a database 30, and transferring to the NC device 24, (2) an operation schedule creation section 51 and (3) a ladder transfer section 56.

The operation schedule creation section 51 creates an operation schedule Qi for the FMS line for properly carrying out the machining schedule hi drawn by the automatic transfer system determining section 19, stores it in a database 52 and at the same time retrieves a control program Wi based on this operation schedule Qi from a database 54. When the automatic transfer system determining section 19 determines transfer system based on the monitor information Ui, it creates an operation schedule based on this transfer system and stores it in the database 52.

The ladder transfer section 56 draws the operation schedule Qi created by the operation schedule creation section 51 from the database 52 and the control program Wi based on this operation schedule Qi from the database 54.

Thereafter, the ladder transfer section 56 retrieves a ladder sequence program (to be referred to as "ladder program Li" hereinafter) for controlling the FMS line based on this control program Wi from the database 58 and transfers it to the line control board 22.

The database 58 stores a plurality of ladder programs for operating machine tools, warehouse equipment and workpieces in the FMS line.

The ladder programs include (a) a ladder program for complex machining, using a machining line consisting of an NCT, a laser and the like for multi-type small-quantity production and single-item uniform production, (b) a ladder program for carrying out a plurality of schedules simultaneously, (c) a ladder program for operating a device that requires special judgment before and after, (d) a ladder program for operating a facility that requires a certain measure of intelligent judgment when trouble occurs, (e) a ladder program that requires synchronization between composite lines, and the like.

The database 54 stores a plurality of control programs such as an NC-MP control program (NC-manipulator control program), M-code control program, direct control program and the like.

Figure 11:
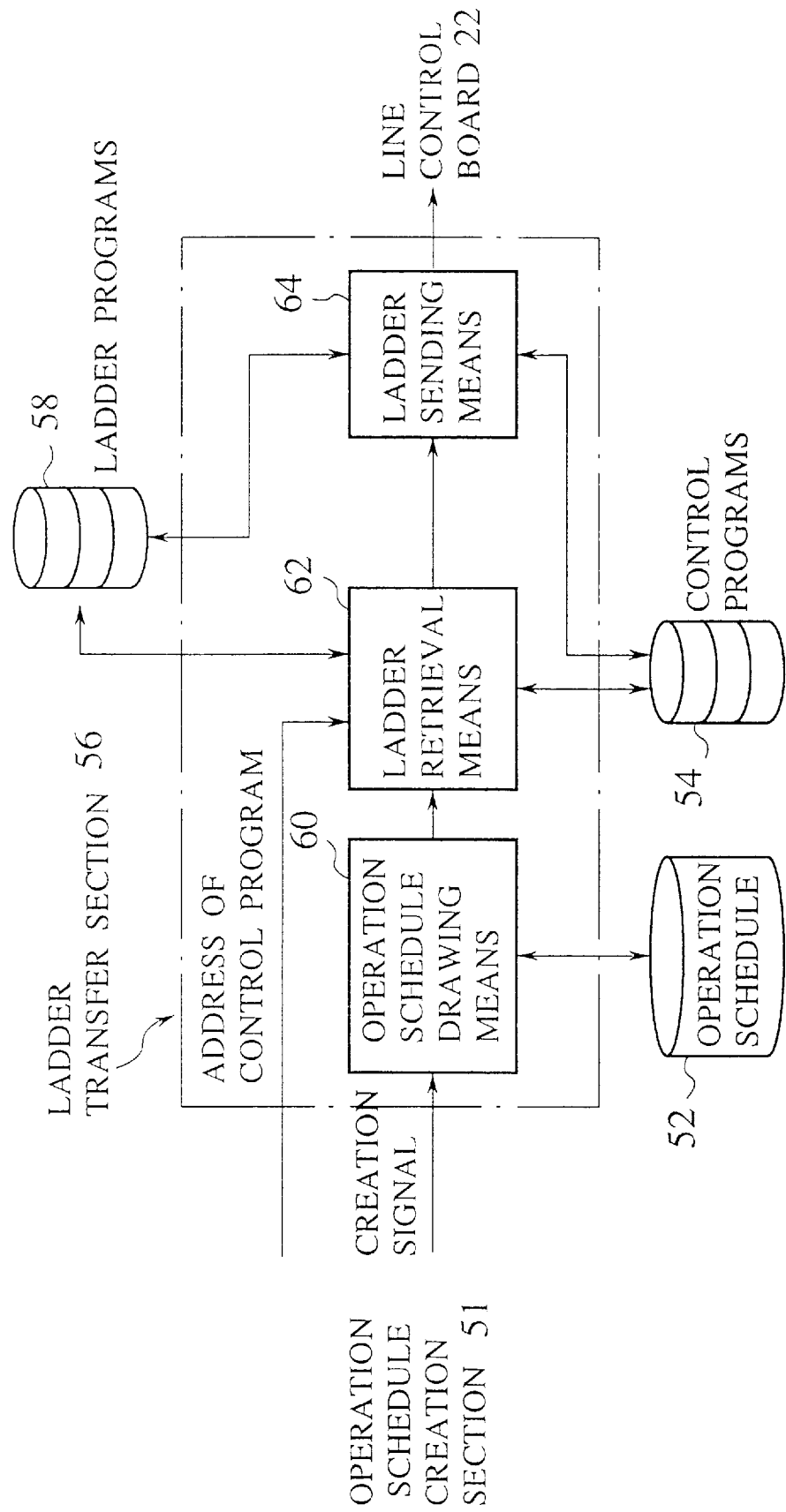
FIG. 11 is a schematic structural diagram of a controller of Embodiment 2 of the present invention.

The ladder transfer section 56, as shown in FIG. 11, comprises operation schedule drawing means 60, ladder retrieval means 62 and ladder sending means 64.

The operation schedule drawing means 60 draws the operation schedule Qi created by the operation schedule creation section 51 from the database 52.

The ladder retrieval means 62 receives the operation schedule Qi drawn by the operation schedule drawing means 60, draws the control program Wi based on this operation schedule Qi from the database 54 and retrieves a ladder program Li for carrying out these from the database 58.

The ladder sending means 64 changes the ladder program retrieved by the ladder retrieval means 62 into a predetermine format and transfers it to the line control board 22.

Figure 12:
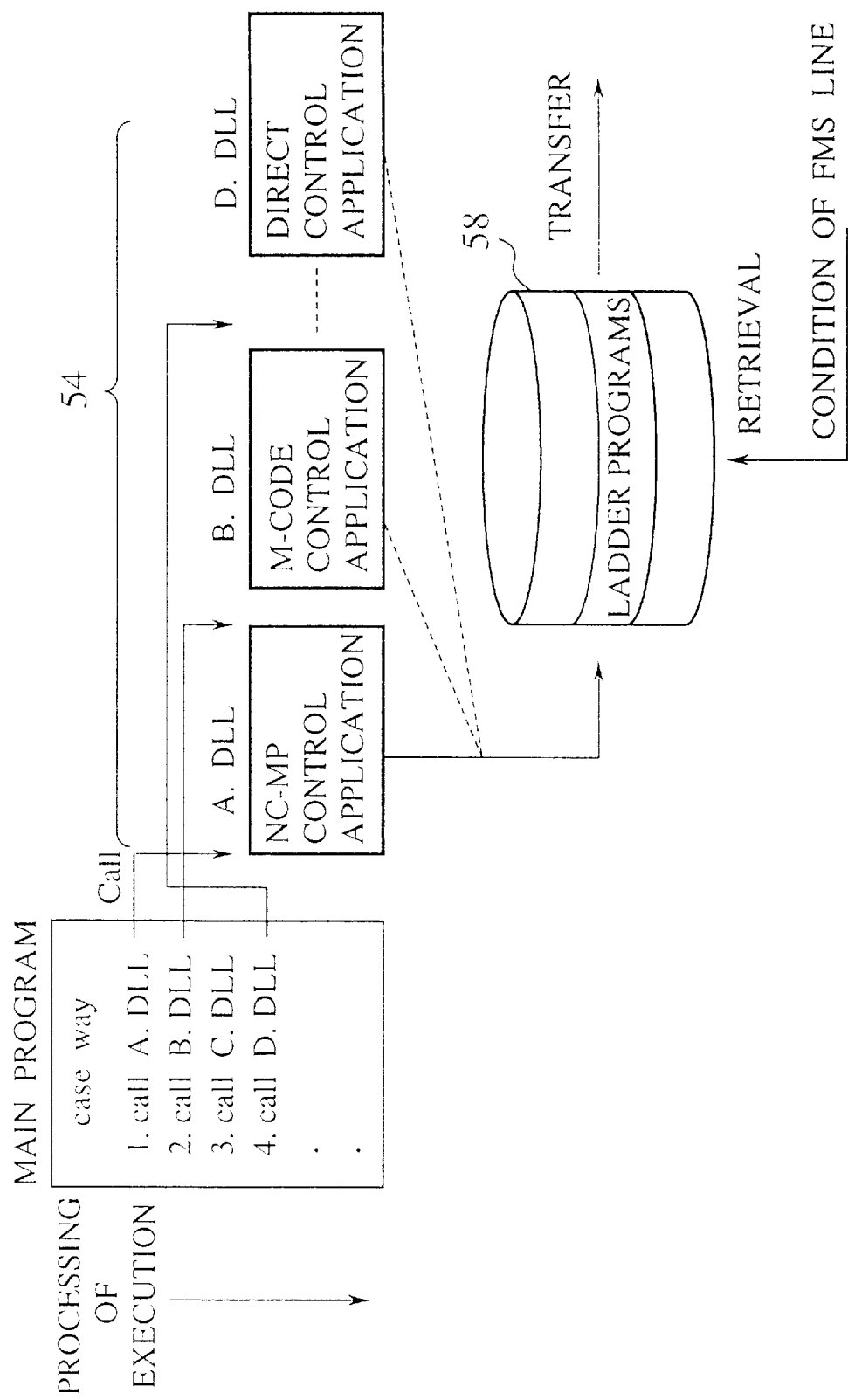
FIG. 12 is a diagram for explaining Embodiment 2.

That is, the machine tool control system constituted above, as shown in FIG. 12, accesses the control program Wi of the database 54 related to the operation schedule Qi after the operation schedule creation section 51 executes the processing of creating the operation schedule Qi according to a main program.

The ladder transfer section 56 retrieves a ladder program Li for the control program Wi from the database 58 and sends it to the line control board 22.

Therefore, the ladder program at the time when a new operation schedule is created based on the current condition of the FMS line is set in the FMS line.

As described on the foregoing pages, according to one aspect of the invention, when a machining program copied from the toll center is to be transferred to the NC device, the machining schedule copied from the toll center and its machining program are compared with judging rules to judge whether memory transfer or DNC transfer system is more suitable and the machining program is transferred by transfer system based on the result of this judgement.

Therefore, there is obtained such an effect that the machining program is automatically transferred by one of the transfer systems sequentially.

According to another aspect of the invention, since the set data of judging rules are updated based on the monitor information of the line control board, actual machining type of a user is reflected on the judging rules sequentially.

As a consequence, since memory transfer or DNC transfer system is selected based on the condition when actual machining is conducted on the line, there is obtained such an effect that a machining program can be transferred by transfer system in accordance with the machining type of a user.

According to another aspect of the invention, a weighting coefficient of each set data of judging rules is computed based on a priority item for machining operation contained in the monitor information from the line control board, and it is determined whether memory transfer system or DNC transfer system is more suitable for the transfer of a machining program from the result of computing the weighting coefficient of each item of the judging rules.

Therefore, since transfer system can be determined with production quantity, machining time or the like weighted, there is obtained an effect that machining can be carried out by transfer operation system that meets user's demand.

According to another aspect of the invention, when the schedule drawing means draws a desired machining schedule from the first database, the transfer system determining means retrieves a machining program suitable for this machining schedule from the second database, judges whether the relationship between the machining schedule and the machining program satisfies one of the set data of the memory transfer section and the set data of the DNC transfer section of the judging rules of the third database, and selects transfer system that satisfies the relationship.

Then, when the machining program transfer means selects memory transfer system, a corresponding machining program in the second database is all transferred to the memory of the NC device and when the machining program transfer means selects DNC transfer system, a corresponding machining program in the second database is transferred to the NC device by each block.

That is, since transfer system is determined based on the set data of the transfer section of the judging rules stored in the third database, there is obtained an effect that a machining program can be transferred easily and accurately by transfer system that meets a user's demand.

According to another aspect of the invention, since the judging rule creation means reads the monitor information of the line control board and updates the set data of each section of the third database based on the monitor information, there is obtained an effect that memory transfer system or DNC transfer system can be selected sequentially in accordance with the current condition of the machining line.

According to another aspect of the invention, the transfer judging means compares the set data of the memory transfer section and the set data of the DNC transfer section of the first judging table of the judging rules with a machining program and determines the weighting of these set data.

Transfer system is determined from the product number, the name of a machining program and actual transfer system of the second table.

Therefore, there is obtained an effect that transfer system based on each set data of the first judging table or transfer system of the second judging table can be employed.

According to another aspect of the invention, the judging rule creation means updates the weighing coefficient of each set data of the first judging table of the judging rules to a weighing coefficient obtained by priority indicated by monitor information from the line control board.

Therefore, there is obtained an effect that the weighting coefficient of each set data of the judging rules is changed to a weighting coefficient based on the current condition of the line sequentially.

According to another aspect of the invention, the judging rule creation means stores the name of a product, the name of a machining program and actual transfer system in the machining line monitored by the line monitor board in the second judging table as a set and sets a machining completion symbol in the machining schedule of the first database.

Therefore, there is obtained an effect that it is known whether the machining program of the machining schedule was transferred in the past or previously when the machining schedule is drawn.

According to another aspect of the invention, the transfer system determining means provisionally judges whether the relationship between the machining program and the machining schedule satisfies one of the set data of the memory transfer section or the set data of the DNC transfer section of the first judging table of the judging rules and compares the weighting coefficients of these set data to determine true transfer system.

Therefore, even if the machining program is long, for example, when a field operator decides to give priority to multi-type small-quantity production for reasons of a user, DNC transfer system is employed and not memory transfer system.

Therefore, there is obtained an effect that transfer system really required by a field operator can be employed.

According to another aspect of the invention, when the machining schedule of the first database is read and a machining completion symbol is set in the machining schedule, the transfer system determining means selects the transfer system of the second judging table of the third database.

Therefore, there is obtained an effect that appropriate transfer system can be retrieved with ease for a repeat product.

According to another aspect of the invention, when a control program is drawn, a ladder program suitable for this control program is sent to the monitor control side.

Therefore, there is obtained an effect that the monitor control side does not need to store a huge ladder program and the controller can send a ladder program suitable for the purpose of machining to the line control board on the monitor control side.

According to another aspect of the invention, when an operation schedule is created by the operation schedule creation section based on the current monitor information, a relevant control program is drawn and a ladder program suitable for this control program is sent to the monitor control side.

Therefore, there is obtained an effect that a sequence based on an operation schedule suitable for the current condition of each machine tool can be set in the line control board on the monitor control side.

It should be understood that many modifications and adaptations of the invention will become apparent to those skilled in the art and it is intended to encompass such obvious modifications and changes in the scope of the claims appended hereto.

What is claimed is:

1. A machine tool control system comprising:

a controller for transferring a machining schedule and a machining program corresponding to the machining schedule of a tool center through a local area network and for creating an operation schedule for a monitor control side; and a numerically controlling device for storing the corresponding machining program sent from the controller in a memory and sending the corresponding machining program to machine tools, wherein the controller comprises an automatic transfer system determining section which stores judging rules for judging whether the corresponding machining program should be transferred to the numerically controlling device via a memory transfer system in which all of the corresponding machining program is transferred to the memory of the numerically controlling device or via a direct control (DNC) transfer system in which the corresponding machining program is transferred to the memory of the numerically controlling device block by block, and wherein when the corresponding program is to be transferred to the numerically controlling device, the automatic transfer system determining section compares the judging rules with the machining schedule and the corresponding machining program to automatically determine which of the memory transfer system or direct control (DNC) transfer system is more suitable.

2. A machine tool control system according to claim 1, wherein the judging rules include:

a first judging table which is divided into two sections, for the memory transfer system and the direct control (DNC) transfer system, each section including as set data at least production type information including single-type large-quality production or multi-type small-quality production; average production quantity; machining type; and machining program length, and in which a weighting coefficient is given to each set data;

a second judging table for storing as a set: a product number; a name of a machining program; and a previous transfer system of the memory transfer system and the direct control (DNC) transfer system, and wherein the automatic transfer system determining section comprises:

transfer system determining means for determining whether the machining schedule has a machining completion flag, and when the machining schedule does not have the machining completion flag, for determining that the corresponding machining program should be transferred to the numerically controlling device via the memory transfer system or via the direct control (DNC) transfer system, based on values of the set data of the first judging table and weighting coefficients corresponding to the set data; and machining program transfer means for transferring the machining program to a memory of the numerically controlling device according to the transfer system determined by the transfer system determining means.

3. A machining tool control system according to claim 2, wherein the transfer system determining means determines a judging coefficient for each of the set data, and for each transfer system of the memory transfer system and the direct control (DNC) transfer system, based on each value of each set data, and calculates values M and D in accordance with the following expressions for the memory transfer system and the direct control (DNC) transfer system, and then determines the transfer system based on the values M and D:

$$M = \Sigma(a_p(M) \times b_1)$$

$$D = \Sigma(a_q(D) \times b_1)$$

where $a_p$ is a judging coefficient for each set data for memory transfer system, $a_q$ is a judging coefficient for each set data for direct transfer system, and $b_1$ is a weighting coefficient for each set data.

4. A machine tool control system according to claim 2, wherein when the machining schedule includes the machining completion flag, the transfer system determining means retrieves the name of the machining program for the product number in the machining schedule and selects a previous transfer system corresponding to the retrieved machining program.

5. A machine tool control system according to claim 2, wherein the automatic transfer system determining section further comprises:

judging rule creation means for reading monitor information of a control board, and when a product number included in the monitor information does not coincide with any product number in the second judging table, for storing the included product number, the corresponding name of the machining program, and the corresponding previous transfer system as a new set in the second judging table.

6. A machine tool control system according to claim 5, wherein when the new set is stored in the second judging table, the judging rule creation means sets the machining completion flag with respect to the included product number in the machining schedule.

7. A machine tool control system according to claim 4, wherein the automatic transfer system determining section further comprises:

judging rule creation means for reading monitor information of a control board and for determining whether an actual transfer system included in the monitor information coincides with the previous transfer system stored in the second judging table, and when the actual transfer system included in the monitor information does not coincide with the previous transfer system, for updating the set data in the first judging table based on the monitor information.

8. A machine tool control system according to claim 7, wherein when the actual transfer system included in the monitor information does not coincide with the previous transfer system, the judging rule creation means further calculates the weighting coefficients based on priority data included in the monitor information and updates the weighting coefficients in the first judging table.

9. A machine tool control system according to claim 1, wherein the controller further comprises:

an operation schedule database for storing a plurality of operation schedules;

a control program database for storing a plurality of control programs;

a ladder program database for storing a plurality of ladder programs;

an operation section creation section for creating an operation schedule that properly carries out a machining schedule retrieved by the automatic transfer system determining section in order to store the operation schedule in the operation schedule database, and for retrieving a control program from the control program database based on the operation schedule; and a ladder transfer section for retrieving the operation schedule created by the operation section creation section from the operation schedule database; for retrieving the control program based from the control program database on the operation schedule; and for retrieving a ladder sequence program for controlling a flexible manufacturing system (FMS) line from the ladder program database, based on the control program, in order to transfer the ladder sequence program to an apparatus for monitoring and controlling a machine tool.

\* \* \* \* \*

UNITED STATES PATENT AND TRADEMARK OFFICE
CERTIFICATE OF CORRECTION

PATENT NO. : 5,850,343
DATED : December 15, 1998
INVENTOR(S) : Kaoru NAKAMURA

It is certified that error appears in the above-identified patent and that said Letters Patent is hereby corrected as shown below:

At column 16, line 44 (claim 2, line 7) of the printed patent, "large-quality" should be ---large-quantity---.

At column 16, line 45 (claim 2, line 8) of the printed patent, "small-quality" should be ---small-quantity---.

Signed and Sealed this

Seventh Day of December, 1999

Attest:

Q. TODD DICKINSON

*Attesting Officer*  *Acting Commissioner of Patents and Trademarks*